April 14, 1925.  1,533,438

F. L. MAIN

VEHICLE WHEEL

Filed April 2, 1923   2 Sheets-Sheet 1

INVENTOR.
Frank L. Main
BY Edward N. Pagelsen
ATTORNEY.

April 14, 1925.

F. L. MAIN 1,533,438

VEHICLE WHEEL

Filed April 2, 1923

2 Sheets-Sheet 2

INVENTOR.
Frank L. Main.
BY Edward N. Pagelsen.
ATTORNEY.

Patented Apr. 14, 1925.

1,533,438

UNITED STATES PATENT OFFICE.

FRANK L. MAIN, OF BIRMINGHAM, MICHIGAN, ASSIGNOR TO HAYES WHEEL COMPANY, OF JACKSON, MICHIGAN, A CORPORATION OF MICHIGAN.

VEHICLE WHEEL.

Application filed April 2, 1923. Serial No. 629,280.

*To all whom it may concern:*

Be it known that I, FRANK L. MAIN, a citizen of the United States, and residing at Birmingham, in the county of Oakland and State of Michigan, have invented a new and Improved Vehicle Wheel, of which the following is a specification.

This invention relates to the construction of vehicle wheels, particularly to that type of wheels in which the hub and felly or rim portions are connected by means of an annulus of sheet metal, usually known as the disc.

Discs for vehicle wheels of this character are usually sheared from rectangular blanks, entailing the loss of a considerable portion of metal at the corners of the blanks.

The object of the present invention is to utilize these corners which have heretofore been wasted for the purpose of providing supporting members extending along the inside surfaces of removable rims and to provide flanges to position the rims and to resist the lateral pressures of the clamping rings, lugs or plates normally employed to secure the rims in position.

A further object of this invention is to provide flanges at intervals along the peripheries of the discs of vehicle wheels so formed as to receive the various standard rims now on the market.

This invention therefore consists in a vehicle wheel disc having flanges at intervals along its outer periphery adapted to receive and support demountable rims.

It further consists in vehicle wheel discs of this character having their central portions so drawn as to accurately fit flanges on the hubs of the wheels, thus avoiding the necessity of machining the discs and the means for attaching the discs to the hubs.

This invention further consists in a vehicle wheel disc having its central portion so drawn as to provide at least two annular bearing surfaces whose sections along axial planes are straight.

It further consists in the details of construction illustrated in the accompanying drawings and particularly pointed out in the claims.

Figure 1:
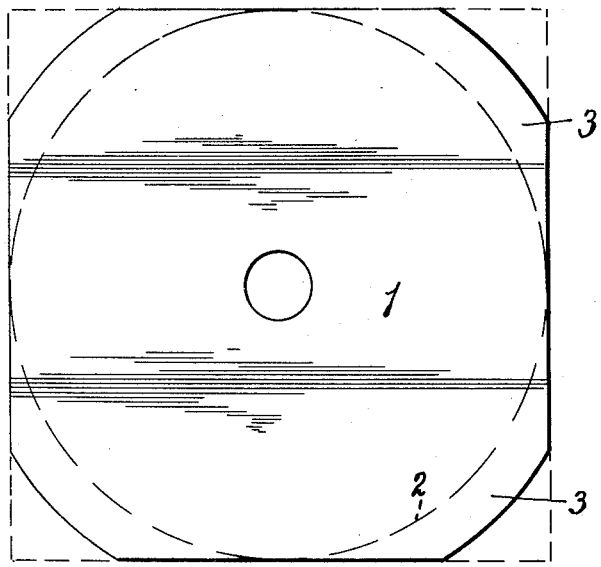
Figure 2:
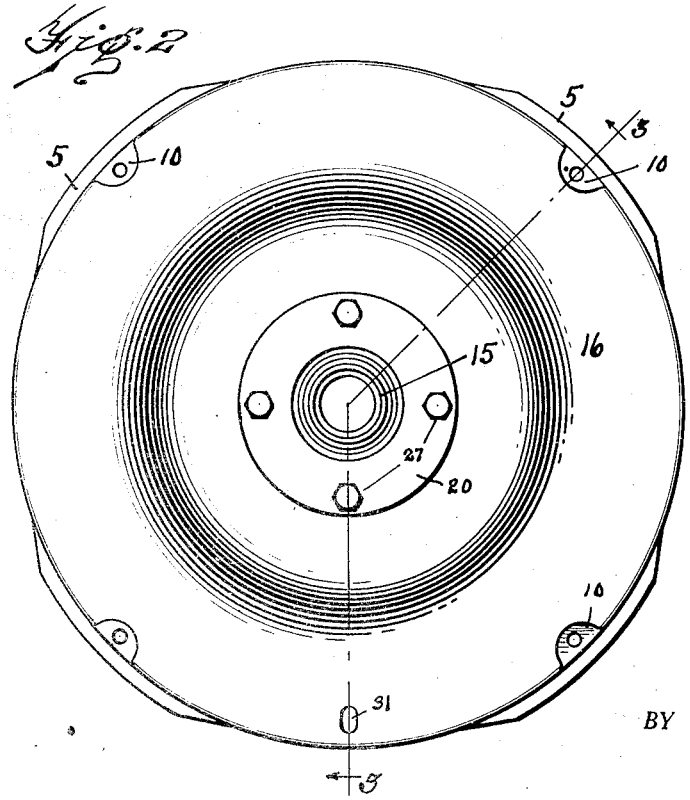
Figure 3:
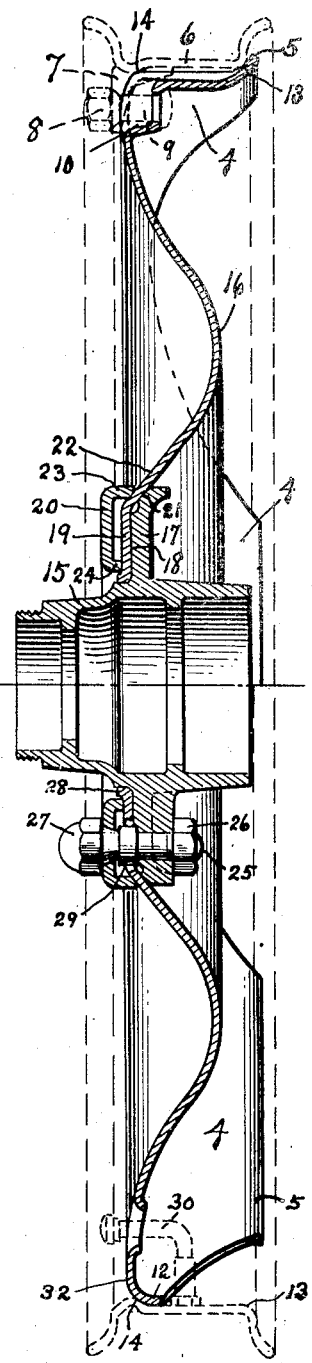
Figure 4:
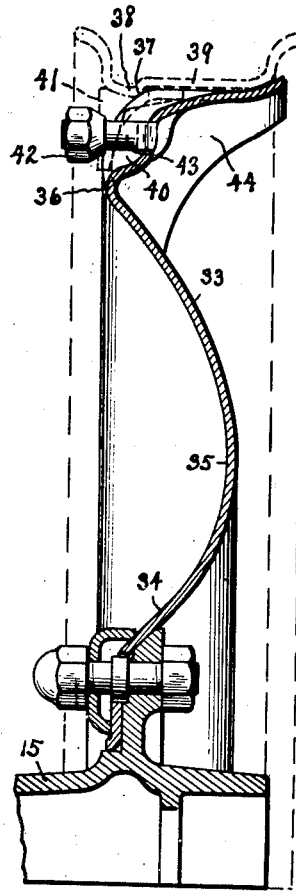
Figure 5:
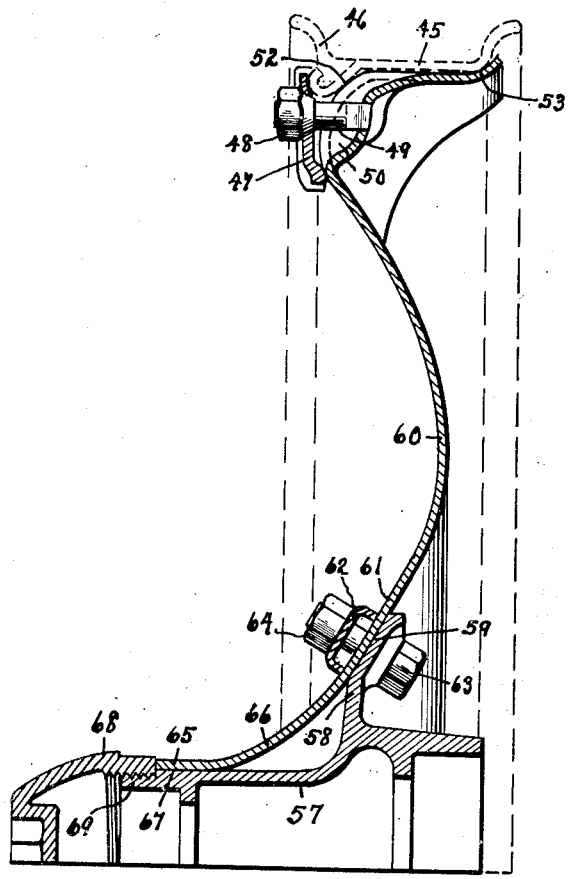
Figure 6:
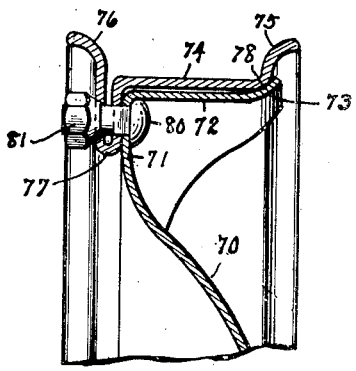
Figure 7:
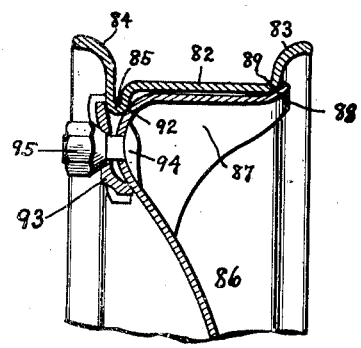

In the accompanying drawings, Fig. 1 is a plan of a wheel disc blank after being sheared and preparatory to being drawn. Fig. 2 is a side elevation on a larger scale of this blank after being drawn and attached to the hub portion of the wheel. Fig. 3 is a section on the line 3—3 of Fig. 2 on a larger scale. Figs. 4 and 5 are radial sections of two other embodiments of this invention. Figs. 6 and 7 are radial sections of rim portions of other embodiments of this invention.

Similar reference characters refer to like parts throughout the several views.

Referring to the drawings, Fig. 1 shows a flat sheet of metal 1 having the corners cut away and indicating by a dotted line 2 the normal diameter of a disc which might be cut from this blank. The parts 3 between the dotted line 2 and the exterior solid lines are those portions of the blank which are bent as hereinafter described to constitute supporting flanges at intervals along the circumference of the finished disc, these flanges substantially merging into each other. The idea of providing flanges along the circumferences of discs has been suggested, but in all cases these flanges were continuous and necessitated blanks of much greater diameters than the ultimate diameters of the discs.

In the present case the original blank need be but of little greater diameter, hardly more than one-quarter inch, than would be necessary for a finished disc having no flange at all, and advantage is taken and use is made of the material which has heretofore been wasted, which material is shown by the parts 3 in Fig. 1. These parts 3 are so drawn as to constitute the cylindrical flanges 4 shown in Fig. 3 having outwardly extending edges 5 to act as abutments for the demountable rims.

The exact shapes of the several flanges at the circumference of the disc may be varied according to the type of the rims used on the wheel. In Fig. 3 the rim 6 shown in dotted lines is of the split rim type and is held in position on the disc by means of the lugs 7 shown in dotted lines which are attached to the rim and the nuts 8 on the bolts 9. The disc is formed with pockets 10 at intervals to receive these lugs 7 and I have found that four of these lugs are sufficient to firmly secure the rim in position because of the long line bearings between the flanges 4 and the rim along the line 13. In addition to these line bearings, a bearing occurs along the line 14 between the disc and the rim, except at the pockets 10, which are very short. These two-line bearings, one of which is a complete circumference and the other of which is substantially forty per cent of the circumference and evenly spaced, furnish sufficient support for any of the present types of split rims. The edge of the disc between the flanges 4 is preferably curved to constitute narrow edge flanges 12.

The central portion of the disc, that is, the portion substantially midway between the rim and hub 15, the portion 16, is in the form of an arch and therefore of great strength. The inner portion is drawn to fit against the flange 17 on the hub and is secured to this flange in any desired manner. In Fig. 3 the flange is generally radial and has a radial surface 18 against which the inner portion 19 of the disc is secured by means of the clamping ring 20. The outer edge 21 of the flange 17 is conical to receive the conical portion 22 of the disc, which conical portion is tangential to the arch 16.

The clamping ring 20 has flanges 23 and 24 which serve to press the portions 19 and 22 of the disc against the surfaces 18 and 21 of the flange 17 of the hub, and is secured in position and the disc is properly positioned by means of the bolts 25 and the nuts 26 and 27. The inner periphery of the disc is formed with a slight cylindrical flange 28 which bears directly on the hub and therefore perfectly centers the disc and the rim. It will be noticed that there is considerable clearance around the enlarged portion of the collar 29 on the bolt 25 which is permissible because the torque between the hub and the disc is transmitted by friction, which can be sufficiently produced by means of the bolts 25 and the clamping ring 20. I prefer to form the inner end of the nut 27 conical so that it will give maximum support to the clamping ring 20, the holes in this ring being made rather large to permit of ready removal and replacement. It will be noticed that the portion 19 at the inner periphery and the portion 32 near the outer periphery are in substantially the same plane. While I do not wish to be limited, I have found that an angle of forty-five degrees between the plane of the wheel and the inclined portion 22 of the disc gives most satisfactory results. The tire valve 30 indicated in dotted lines will extend through a small slot 31 in the disc, as indicated in Figs. 2 and 3.

In Fig. 4 I have shown a hub 15 substantially similar to the hub shown in Fig. 3, but the disc 33 is differently curved in cross section. The part 34 is again about forty-five degrees to the axis of the wheel and from that point the curve of the arch 35 decreases outwardly to the line 36 where an easy reverse curve begins, which ends at the line 37 of contact with the bead 38 of the rim 39. The disc is again formed with pockets 40 to receive the lugs 41 on the rim, which are again held in position by means of the nuts 42 and bolts 43. In this case, as in that previously described, these pockets 42 are adjacent and within the circumferential limits of the flanges 44 formed by the parts 3 of the blanks shown in Fig. 1 and the arch formed in the metal of the disc by reason of these depressions serves to stiffen the disc at these points.

Referring to Fig. 5, the rim 45 is entire and is provided with a split locking ring 46 to hold the tire in position. This rim is held in position by means of the clamps 47 and the nuts 48 on the bolts 49. The pockets 50 are again provided in order that the rims 39 shown in Fig. 4 together with their lugs 41 may be mounted on this type of disc. In Fig. 5 the rim 45 and the disc engage along the lines 52 and 53, which again results in wide and nearly balanced support for the removable rim and the tire thereon.

In the construction shown in Fig. 5, the hub 57 has a flange 58 provided with a conical surface 59 and the disc is formed with a transverse arch 60 that merges into a conical portion 61 that bears against the conical surface 59 of the flange 58 and is held against this flange by means of the clamping ring 62, the bolts 63 and the nuts 64. The disc merges into a cylindrical inner edge 65 through a curved portion 66 and this cylindrical portion 65 bears on the cylindrical portion 67 of the hub and abuts against a nut 68 which is firmly secured on the threaded outer end 69 of the hub. In this case again the bearing surfaces may be termed straight, one being conical and the other cylindrical, and these surfaces are easily machined. The hub need not be finished except along the surfaces 67 and 59 in order to get a perfect contact with the disc.

In Fig. 6 the arched portion 70 of the disc merges easily into a circular portion 71 which unites to substantially cylindrical flanges 72 formed from the parts 3 of the blank shown in Fig. 1, and these cylindrical flanges end in outer curves 73. The split rim 74 has a cylindrical portion and two flanges 75 and 76, the latter being connected to the cylindrical portion by means of a double fold 77 integral therewith, the inner surface of this double fold being circular and bearing against the circular portion 71 of the disc. The opposite side of the rim contacts along a line 78 with each flange 72. This rim is held in position by means of the bolts 80 and nuts 81.

In Fig. 7, the split rim 82 is shown formed with an inner flange 83 and an outer flange 84 which is connected to the main part of the rim by means of the inwardly extending bead 85. The disc 86 again merges into the flanges 87 by means of easy curves and the flanges again have the curved outer edges 88 which contact along the lines 89 with the rim. The bead 85 has a line contact at 92 with the disc and is held in position by means of clamps 93, bolts 94 and nuts 95.

The details of construction and the proportions of the parts may be further modified by those skilled in the art without departing from the spirit of my invention as set forth in the following claims.

I claim:—

1. A disc for vehicle wheels adapted to be mounted on a hub and to extend to the rim and constituting a radial arch and having laterally extending flanges at intervals along its outer periphery, said flanges merging into each other by short narrow cylindrical edges along the disc.

2. A disc for vehicle wheels adapted to be mounted on a hub and to extend to the rim and constituting a radial arch and having laterally extending flanges at intervals along its outer periphery.

3. A disc for vehicle wheels to connect the hub and the rim, said disc being formed with laterally extending substantially cylindrical flanges at intervals along its outer periphery, said disc adapted to have a continuous line contact along one edge of the rim and the flanges to have interrupted line contacts along the other edge of the rim.

4. A disc for vehicle wheels to connect the hub and the rim, said disc being formed with laterally extending substantially cylindrical flanges at intervals along its outer periphery, said disc adapted to have a continuous line contact along one edge of the rim and the flanges to have interrupted line contacts along the other edge of the rim, the edges of said flanges constituting zigzag lines.

5. In a vehicle wheel, a hub, a disc engaging said hub and formed to constitute a circular arch, the outer edge of said disc being curved laterally and merging into substantially cylindrical interrupted flanges, the outer edges of the said flanges being curved outwardly, the disc and flanges being adapted to receive a rim and engage therewith along circumferential lines, and means to hold the rim on the disc.

FRANK L. MAIN.